US010390364B2

(12) United States Patent
Hall et al.

(10) Patent No.: US 10,390,364 B2
(45) Date of Patent: Aug. 20, 2019

(54) APPARATUS AND METHOD FOR DYNAMICALLY CONTROLLING SPECTRUM ACCESS

(71) Applicant: The United States of America, as represented by the Secretary of Commerce, Gaithersburg, MD (US)

(72) Inventors: Timothy A. Hall, Gaithersburg, MD (US); Anirudha Sahoo, North Potomac, MD (US); Charles Hagwood, Washington, DC (US); Sarah Streett, Louisville, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 15/815,776

(22) Filed: Nov. 17, 2017

(65) Prior Publication Data

US 2018/0302920 A1 Oct. 18, 2018

Related U.S. Application Data

(60) Provisional application No. 62/486,640, filed on Apr. 18, 2017.

(51) Int. Cl.
*H04W 74/00* (2009.01)
*H04W 16/14* (2009.01)
*H04W 24/08* (2009.01)

(52) U.S. Cl.
CPC ......... *H04W 74/006* (2013.01); *H04W 16/14* (2013.01); *H04W 24/08* (2013.01)

(58) Field of Classification Search
CPC ... H04W 74/00; H04W 74/006; H04W 24/08; H04W 16/14
See application file for complete search history.

(56) References Cited

U.S. PATENT DOCUMENTS 7,321,881 B2 * 1/2008 Saidi ...................... G06N 3/084
706/21
7,965,641 B2 * 6/2011 Ben Letaief .......... H04L 5/0032
370/237

(Continued)

OTHER PUBLICATIONS

M. Sharma, et al.,"Stoohastic Model Based Opportunistic Channel Access in Dynamic Spectrum Access networks," IEEE Transactions on Mobile Computing, Jul. 2014, pp. 1625-1639, vol. 13, No. 7.

(Continued)

*Primary Examiner* — Mansour Oveissi
*Assistant Examiner* — Jonathan Wood
(74) *Attorney, Agent, or Firm* — Office of Chief Counsel for National Institute of Standards and Technology

(57) ABSTRACT

A process for dynamically controlling spectrum access includes: collecting occupancy data; applying nonparametric estimation to the occupancy data; determining a cumulative hazard function; receiving a service request to occupy the wireless communication channel from a secondary user; accepting the service request from the secondary user if the wireless communication channel is unoccupied by the primary user; calculating a maximum duration for which the secondary user may occupy the wireless communication channel; determining a probability that a remaining idle time of the primary user is greater than an occupation time of the wireless communication channel of the secondary user; granting access to the secondary user for occupation of the wireless communication channel if the probability is greater than a selected probability threshold; and denying access to the secondary user for occupation of the wireless commu- (Continued)

nication channel if the probability is less than the selected probability threshold to dynamically control spectrum access.

8 Claims, 11 Drawing Sheets

(56) References Cited

U.S. PATENT DOCUMENTS

| | | | | |
|---|---|---|---|---|
| 8,463,188 | B2 | 6/2013 | Gan et al. | |
| 8,761,677 | B2* | 6/2014 | Kim | H04L 27/0006 375/240.21 |
| 8,838,520 | B2* | 9/2014 | Laneman | G06N 5/04 706/52 |
| 9,029,093 | B2* | 5/2015 | Anderberg | G01N 33/6893 435/7.1 |
| 10,009,488 | B1* | 6/2018 | Ebner | H04N 1/00344 |
| 2011/0161047 | A1* | 6/2011 | Sazuka | G06F 11/3452 702/179 |
| 2011/0246411 | A1* | 10/2011 | Laneman | G06N 5/04 706/52 |
| 2013/0203427 | A1* | 8/2013 | Hoyhtya | H04W 16/14 455/450 |
| 2014/0126488 | A1* | 5/2014 | Learned | H04W 24/02 370/329 |
| 2014/0161002 | A1* | 6/2014 | Gauvreau | H04L 1/1893 370/280 |
| 2015/0100284 | A1* | 4/2015 | Teravainen | G06F 17/504 703/2 |
| 2016/0088486 | A1* | 3/2016 | Taher | H04W 16/14 455/454 |
| 2016/0150415 | A1* | 5/2016 | Laneman | H04W 16/14 455/452.2 |
| 2018/0231557 | A1* | 8/2018 | Krause | G01N 33/57423 |

OTHER PUBLICATIONS

L.T.S. Geirhofer, et al.,"Dynamic spectrum access in WLAN channels:Empirical model and its stochastic analysis", International WorkShop on Tech. and Policy for Accessing Spectrum (TAPAS). 2006,pp. 1-10.

Q. Zhao, et al., "Decentralized Cognitive MAC for Opportunistic Spectrum Access in Ad Hoc Networks: A POMDP Framework," IEEE Jounal on Selected Areas in Communications., Apr. 2007, pp. 589-600, vol. 30, No. 2.

K.W. Sung, et al.,"Temporal Spectrum Sharing Based on Primary User, Activity Prediction," IEEE Transactions on Wireless Communications, Dec. 2010, pp. 3848-3855, vol. 9 No. 12.

A. Plummer, et al., "Measurement based bandwidth scavenging in wireless networks," IEEE Transactions on Mobile Computing, Jan. 2012, pp. 19-32, vol. 11, No. 1.

P.Huang, et al., "Wireless Spectrum Occupancy Prediction Based on Partial Periodic Pattern Mining," IEEE 20th International Symposium on Modeling, Analysis and Simulation of Computer and Telecommunication Systems, 2012, pp. 51-58.

H. Kim,et al., "Efficient Discovery of Spectrum Opportunities with MAC-layer Sensing in Cognitive Radio Networks", IEEE Transactions on Mobile Computing, May 2008, pp. 533-545, vol. 7,No. 5.

* cited by examiner

APPARATUS AND METHOD FOR DYNAMICALLY CONTROLLING SPECTRUM ACCESS

CROSS REFERENCE TO RELATED APPLICATIONS

This application claims the benefit of U.S. Provisional Patent Application No. 62/486,640, filed on Apr. 18, 2017, the entire content of which is incorporated herein by reference.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov.

BRIEF DESCRIPTION

Disclosed is a process for dynamically controlling spectrum access, the process comprising: collecting occupancy data of a primary user of a wireless communication channel; applying a nonparametric estimation to the occupancy data; determining a cumulative hazard function of the occupancy data, based on the nonparametric estimation; receiving a service request to occupy the wireless communication channel from a secondary user; calculating a maximum duration for which the secondary user may occupy the wireless communication channel; determining a probability that a remaining idle time of the primary user is greater than an occupation time of the wireless communication channel of the secondary user; granting access to the secondary user for occupation of the wireless communication channel if the probability is greater than a selected probability threshold; and denying access to the secondary user for occupation of the wireless communication channel if the probability is less than the selected probability threshold to dynamically control spectrum access.

Also disclosed is a computer-implemented method, comprising: collecting occupancy data of a primary user of a wireless communication channel; applying a nonparametric estimation to the occupancy data; determining a cumulative hazard function of the occupancy data, based on the nonparametric estimation; receiving a service request to occupy the wireless communication channel from a secondary user; calculating a maximum duration for which the secondary user may occupy the wireless communication channel; determining a probability that a remaining idle time of the primary user is greater than an occupation time of the wireless communication channel of the secondary user; granting access to the secondary user for occupation of the wireless communication channel if the probability is greater than a selected probability threshold; and denying access to the secondary user for occupation of the wireless communication channel if the probability is less than the selected probability threshold to dynamically control spectrum access.

Further disclosed is a system comprising one or more computers configured to perform operations, the operations comprising: collecting occupancy data of a primary user of a wireless communication channel; applying a nonparametric estimation to the occupancy data; determining a cumulative hazard function of the occupancy data, based on the nonparametric estimation; receiving a service request to occupy the wireless communication channel from a secondary user; calculating a maximum duration for which the secondary user may occupy the wireless communication channel; determining a probability that a remaining idle time of the primary user is greater than an occupation time of the wireless communication channel of the secondary user; granting access to the secondary user for occupation of the wireless communication channel if the probability is greater than a selected probability threshold; and denying access to the secondary user for occupation of the wireless communication channel if the probability is less than the selected probability threshold to dynamically control spectrum access.

Also disclosed is a computer-readable medium having instructions stored thereon, which, when executed by a processor, cause the processor to perform operations comprising: collecting occupancy data of a primary user of a wireless communication channel; applying a nonparametric estimation to the occupancy data; determining a cumulative hazard function of the occupancy data, based on the nonparametric estimation; receiving a service request to occupy the wireless communication channel from a secondary user; calculating a maximum duration for which the secondary user may occupy the wireless communication channel; determining a probability that a remaining idle time of the primary user is greater than an occupation time of the wireless communication channel of the secondary user; granting access to the secondary user for occupation of the wireless communication channel if the probability is greater than a selected probability threshold; and denying access to the secondary user for occupation of the wireless communication channel if the probability is less than the selected probability threshold to dynamically control spectrum access.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

Advantageously and unexpectedly, it has been discovered that a method based on survival analysis involves dynamically controlling spectrum access to a secondary user (SU) during a time when a wireless communication channel is idle, i.e., when the wireless communication channel is unoccupied by a primary user (PU). The method does not assume any particular PU occupancy distribution (e.g., exponential) nor does it require that PU occupancy data be fitted to a known distribution. The method can include a non-parametric estimate of the cumulative hazard function to compute a duration of an SU transmission such that an interference caused to the PU is below a given threshold.

Moreover, survival times and channel idle times are involved in the method. Survival analysis is analysis of failure of physical components that can include, e.g., death of biological units, response times, and the like. Opportunistic access to the spectrum carried by the wireless communication channel and accessed by the SU is analyzed by survival analysis. Further, the method provides a hypothesis test: given that the spectrum has been idle for duration t, will the probability that the spectrum be idle for the next duration d be greater than a predefined probability p? That is, will an idle period survive long enough for the secondary user to transmit successfully? The cumulative hazard function from survival analysis tests the hypothesis, and the method then generates a result for dynamically controlling spectrum access. Beneficially, the method includes non-parametric estimation to compute the hazard function.

Figure 1:
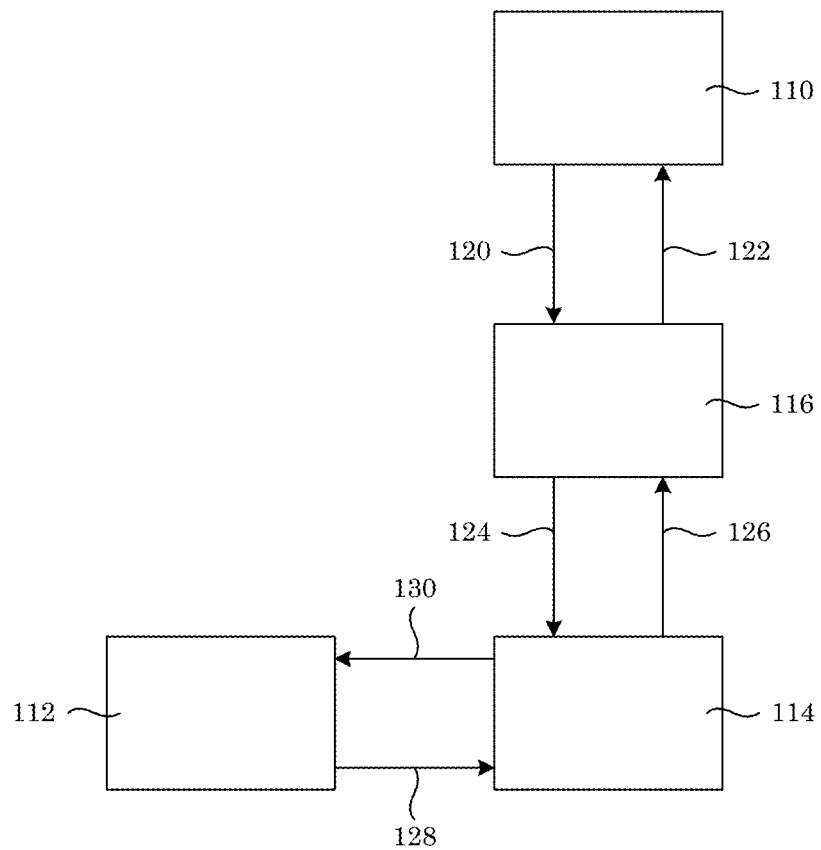
FIG. 1 shows system for dynamically controlling spectrum access.
Figure 4:
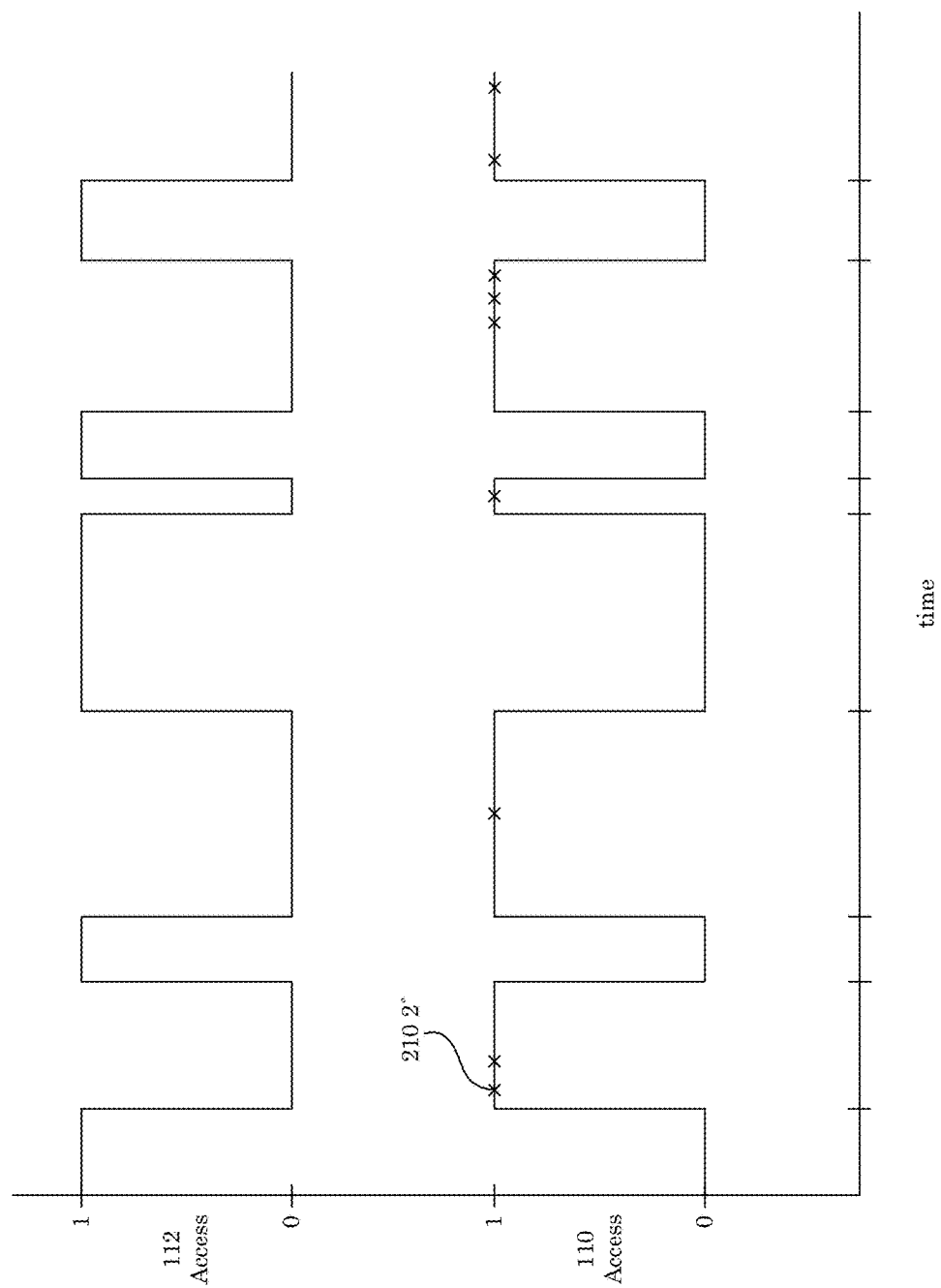
FIG. 4 shows a graph of access versus time for dynamically controlling spectrum access.

In an embodiment, with reference to FIG. 1, apparatus 100 dynamically controls spectrum access and includes dynamic controller 116 in communication with wireless communication channel 114. Dynamic controller 116 sends channel status request 124 to wireless communication channel 114 and receives channel status response 126 from wireless communication channel 114. Here, primary user 112 is in communication with wireless communication channel 114 such that primary user 112 receives channel status 130 from wireless communication channel 114 and sends primary user data 128 to wireless communication channel 114. In this manner, primary user 112 occupies wireless communication channel 114 with primary user data 128. Secondary user 110 is in communication with dynamic controller 116, wherein secondary user 110 sends service request 120 to dynamic controller 116 and receives service response 122 from dynamic controller 116. Accordingly, dynamic controller 116 dynamically controls access to wireless communication channel 114 by secondary user 110 based on occupation of wireless communication channel 114 by primary user 112 as shown in FIG. 4, wherein when primary user 112 occupies (i.e., access level=1) wireless communication channel 114, dynamic controller 116 rejects access of wireless communication channel 114 to secondary user 110. When wireless communication channel 114 is unoccupied by primary user 112 (i.e., access level=0), dynamic controller 116 may allow access of wireless communication channel 114 to secondary user 110.

Figure 2:
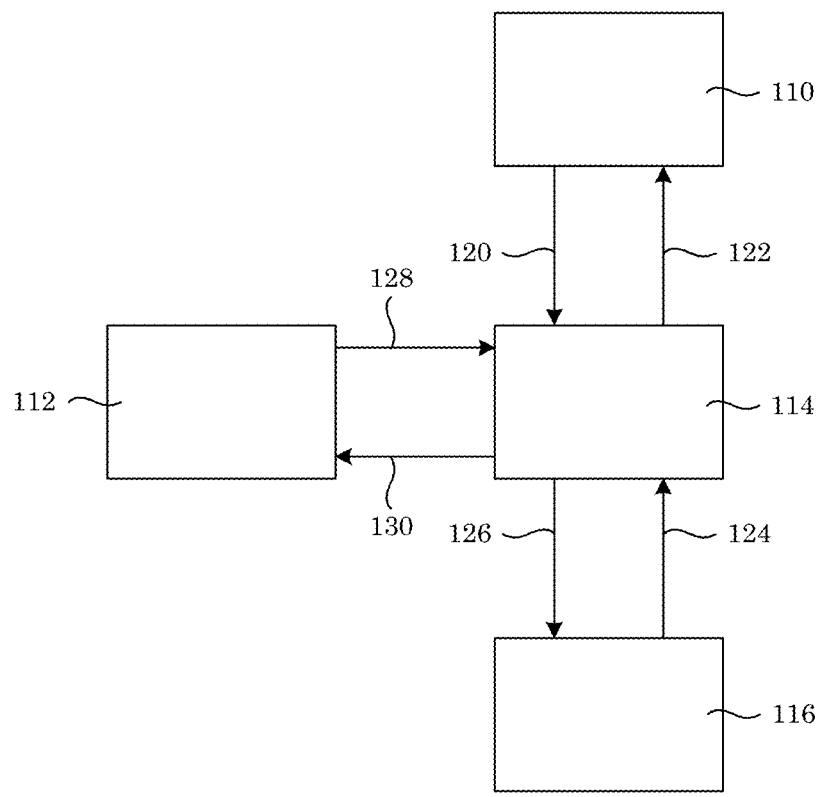
FIG. 2 shows system for dynamically controlling spectrum access.

In an embodiment, with reference to FIG. 2, apparatus 100 dynamically controls spectrum access and includes dynamic controller 116 in communication with wireless communication channel 114. Dynamic controller 116 sends channel status request 124 to wireless communication channel 114 and receives channel status response 126 from wireless communication channel 114. Here, primary user 112 is in communication with wireless communication channel 114 such that primary user 112 receives channel status 130 from wireless communication channel 114 and sends primary user data 128 to wireless communication channel 114. In this manner, primary user 112 occupies wireless communication channel 114 with primary user data 128. Further, secondary user 110 is in communication with wireless communication channel 114, wherein secondary user 110 sends service request 120 to wireless communication channel 114 and receives service response 122 from wireless communication channel 114, wherein access to wireless communication channel 114 by secondary user 110 is dynamically controlled by dynamic controller 116 based on a probability of future occupation of wireless communication channel 114 by primary user 112.

Figure 3:
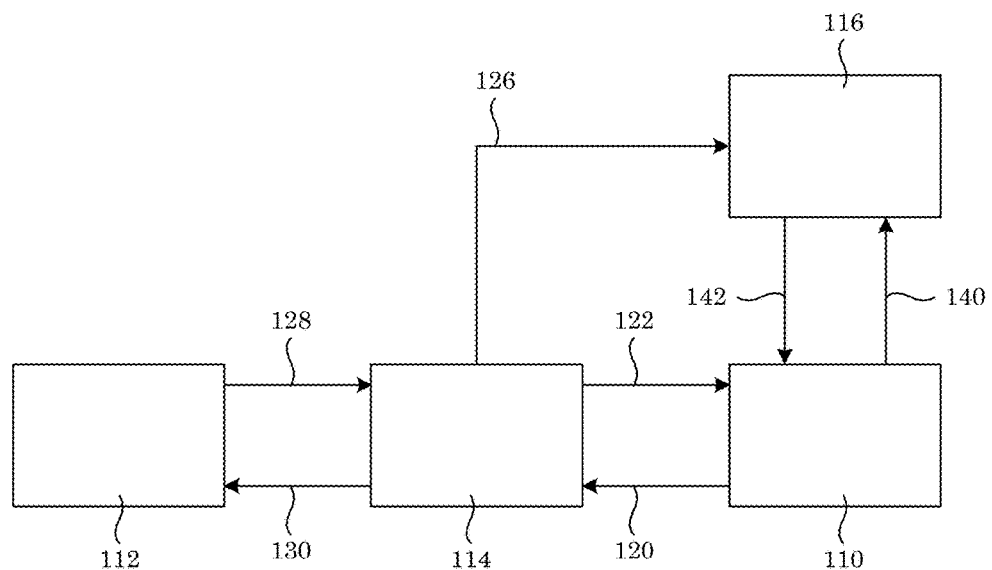
FIG. 3 shows system for dynamically controlling spectrum access.

In an embodiment, with reference to FIG. 3, apparatus 100 dynamically controls spectrum access and includes dynamic controller 116 in communication with wireless communication channel 114 and secondary user 110. Dynamic controller 116 receives channel status 126 from wireless communication channel 114 and service request 140 from secondary user 110. Secondary user 110 sends secondary user data 120 to wireless communication channel 114, receives service response 142 from dynamic controller 116, and receives channel status 122 from wireless communication channel 114. Moreover, primary user 112 is in communication with wireless communication channel 114 such that primary user 112 receives channel status 130 from wireless communication channel 114 and sends primary user data 128 to wireless communication channel 114. In this manner, primary user 112 occupies wireless communication channel 114 with primary user data 128, and secondary user 110 obtains access to wireless communication channel 114 according to provision of occupancy by dynamic controller 116. When wireless communication channel 114 is unoccupied by primary user 112 (i.e., access level=0), dynamic controller 116 may allow access of wireless communication channel 114 to secondary user 110.

Dynamic controller 116 dynamically controls access to wireless communication channel 114 and can include various components. Exemplary components of dynamic controller 116 can include a special-purpose processor, such as a digital signal processor (DSP), a general-purpose processor, software, firmware, an application-specific integrated circuit (ASIC) or a combination thereof. In an embodiment, dynamic controller 116 includes a long-term evolution (LTE) base station, a spectrum access server (SAS), or a WiFi access point (AP).

Wireless communication channel 114 is a wireless medium for communication using Radio Frequency (RF) signals and can be part of a wireless service offered by a wireless network operator (WNO) or provided by the wireless network interface hardware in the device. Exemplary components of wireless communication channel 114 can include range of frequency, modulation and encoding schemes, time, space, frequency and code division multiplexing, propagation characteristics, or a combination thereof. In an embodiment, wireless communication channel 114 includes frequency division duplex (FDD) or time division duplex (TDD) uplink and downlink channels of LTE, WIFI, BLUETOOTH, and ZIGBEE channels.

Primary user 112 is the wireless device or system that has the highest priority access to the wireless communications channel 114 and can be a single user or provided by a group or class of users in the aggregate or a system that aggregates a group of users. Exemplary components of primary user 112 can include a user equipment (UE) handset or tablet, a set of networked computing and communication hardware, a system for coordinating multiple users with priority privileges enforced by means of policy or technology, or a combination thereof. In an embodiment, primary user 112 includes a mobile phone, an LTE base station or a WiFi access point.

Secondary user 110 is the wireless device or system that has the lower priority relative to primary user which opportunistically accesses the wireless communications channel 114 when wireless communications channel 114 is not occupied by the primary and can be part of a secondary network or provided by a secondary operator. Exemplary components of secondary user 110 can include a user equipment hardware, a set of networked computing and communication hardware, firmware running the opportunistic spectrum access method, or a combination thereof. In an embodiment, secondary user 110 includes a smart utility meter reader system, a climate control sensor, a temperature reader sensor, handheld devices (e.g., smart phone, tablet) subscribed to low Quality of Service (QoS) LTE service, or a secondary base station.

In an embodiment, a process for dynamically controlling spectrum access includes: collecting occupancy data of primary user 112 of wireless communication channel 114; applying a nonparametric estimation to the occupancy data; determining a cumulative hazard function of the occupancy data, based on the nonparametric estimation; receiving service request 120 to occupy the wireless communication channel 114 from secondary user 110; calculating a maximum duration for which secondary user 110 may occupy wireless communication channel 114; determining a probability that a remaining idle time of primary user 112 is greater than an occupation time of wireless communication channel 114 of secondary user 110; granting access to Secondary user 110 for occupation of wireless communication channel 114 if the probability is greater than a selected probability threshold; and denying access to secondary user 110 for occupation of wireless communication channel 114 if the probability is less than the selected probability threshold to dynamically control spectrum access.

In the process, collecting occupancy data of primary user 112 of wireless communication channel 114 includes detecting the presence of primary user signal.

Applying a nonparametric estimation to the occupancy data includes collecting idle time durations and keeping a record of how many times each duration occurs, e.g., keeping a histogram of the primary user idle time durations.

Determining a cumulative hazard function of the occupancy data, based on the nonparametric estimation includes calculating the estimate of the cumulative hazard function of primary user idle time duration from the collected history of idle time durations.

Receiving service request 120 to occupy the wireless communication channel 114 from secondary user 110 includes using a requested duration or a maximum duration and requested probability of successful transmission.

The process also can include accepting the service request from secondary user 110 if wireless communication channel 114 is unoccupied by primary user 112 by directly or indirectly detecting that the channel is free of primary user signal.

Calculating a maximum duration for which secondary user 110 may occupy wireless communication channel 114 includes evaluating the cumulative hazard function at various points to find the maximum SU transmit duration.

Determining a probability that a remaining idle time of primary user 112 is greater than an occupation time of wireless communication channel 114 of secondary user 110 includes evaluating the difference in value of the cumulative hazard function at the time of the request and at the time of completion of secondary user 100 transmission.

Granting access to Secondary user 110 for occupation of wireless communication channel 114 if the probability is greater than a selected probability threshold includes signaling secondary user 110 either explicitly or implicitly that it may transmit.

Denying access to secondary user 110 for occupation of wireless communication channel 114 if the probability is less than the selected probability threshold includes signaling secondary user 100 either explicitly or implicitly that it may not transmit.

The process further can include rejecting the service request from secondary user 110 if wireless communication channel 114 is occupied by primary user 112 by signaling secondary user 110 either explicitly or implicitly that it may not transmit.

Also disclosed is a computer-implemented method that includes: collecting occupancy data of primary user 112 of wireless communication channel 114; applying a nonparametric estimation to the occupancy data; determining a cumulative hazard function of the occupancy data, based on the nonparametric estimation; receiving service request 120 to occupy the wireless communication channel 114 from secondary user 110; calculating a maximum duration for which secondary user 110 may occupy wireless communication channel 114; determining a probability that a remaining idle time of primary user 112 is greater than an occupation time of wireless communication channel 114 of secondary user 110; granting access to Secondary user 110 for occupation of wireless communication channel 114 if the probability is greater than a selected probability threshold; and denying access to secondary user 110 for occupation of wireless communication channel 114 if the probability is less than the selected probability threshold to dynamically control spectrum access.

Further disclosed is a system including one or more computers configured to perform operations, the operations including: collecting occupancy data of primary user 112 of wireless communication channel 114; applying a nonparametric estimation to the occupancy data; determining a cumulative hazard function of the occupancy data, based on the nonparametric estimation; receiving service request 120 to occupy the wireless communication channel 114 from secondary user 110; calculating a maximum duration for which secondary user 110 may occupy wireless communication channel 114; determining a probability that a remaining idle time of primary user 112 is greater than an occupation time of wireless communication channel 114 of secondary user 110; granting access to Secondary user 110 for occupation of wireless communication channel 114 if the probability is greater than a selected probability threshold; and denying access to secondary user 110 for occupation of wireless communication channel 114 if the probability is less than the selected probability threshold to dynamically control spectrum access.

Also disclosed is a computer-readable medium having instructions stored thereon, which, when executed by a processor, cause the processor to perform operations including: collecting occupancy data of primary user 112 of wireless communication channel 114; applying a nonparametric estimation to the occupancy data; determining a cumulative hazard function of the occupancy data, based on the nonparametric estimation; receiving service request 120 to occupy the wireless communication channel 114 from secondary user 110; calculating a maximum duration for which secondary user 110 may occupy wireless communication channel 114; determining a probability that a remaining idle time of primary user 112 is greater than an occupation time of wireless communication channel 114 of secondary user 110; granting access to Secondary user 110 for occupation of wireless communication channel 114 if the probability is greater than a selected probability threshold; and denying access to secondary user 110 for occupation of wireless communication channel 114 if the probability is less than the selected probability threshold to dynamically control spectrum access.

Apparatus 100 and processes herein have numerous advantageous and beneficial properties that include increased spectrum utilization, no assumptions about the distribution of primary user idle time durations, low memory requirements and low computational complexity, fast training through the estimation of the cumulative hazard function, an easily interpreted performance-tuning parameter that is itself a system performance parameter, namely the probability of successful transmission (and by extension the probability of interference) and decoupling of the training data and process from the run-time performance tuning and, because of the bound on the probability of interference guarantee to the primary user, decreased concern on the part of service providers about sharing the band.

The articles and processes herein are illustrated further by the following Example, which is non-limiting.

EXAMPLE

Exploiting LTE White Space by Dynamically Controlling Spectrum Access based on Survival Analysis.

Processes for dynamic spectrum access (DSA) described here are based on survival analysis and include a non-parametric estimate of the cumulative hazard function to predict the remaining idle time available for secondary transmission subject to the constraint of a preset probability of successful completion. The processes are effective at fine time scales, and their performance is analyzed with data collected from an LTE band for primary user activity. The processes were run in different configurations and were trained and run on a few combinations of data sets. Results show that cumulative hazard functions are similar across datasets, and the process included training on one day's dataset and running on another day's data in an absence of degradation of performance. The processes provide white space utilization and a measured probability of interference that is less than a selected threshold.

DSA mitigates spectrum scarcity, and a primary user (PU) has priority access to a given band. A secondary user (SU) can transmit during unoccupied (idle) periods opportunistically but must vacate when the PU needs the band again. To make efficient use of the spectrum in a DSA environment, an accurate and useful model of spectrum occupancy is needed.

Spectrum occupancy refers to whether a channel or band is occupied. The term channel denotes a smallest allocable range of frequencies within a communications technology, e.g., 180 kHz for LTE. A band includes multiple channels and represents a single service, e.g., there are 50 channels in a 10 MHz LTE uplink band. We model the occupancy of a given channel as a two-state (binary) random process:

$$X(t)=1 \text{ if } P_R(t)>P_{th}, \text{ and } 0 \text{ otherwise,} \quad (1)$$

where $P_R(t)$ is the signal power observed at the receiver at time t and $P_{th}$ is a threshold value. $X(t)=1$ represents the occupied state and $X(t)=0$ represents the unoccupied state.

Predicting spectrum occupancy provides allocating spectrum to secondary users. Here, we developed a prediction scheme that is robust, flexible and useful even for very fine time scales. We assume centrally coordinated scheduling for the SUs. The scheduler knows when the primary user is no longer active, and when an SU requests a transmission opportunity, the scheduler grants or denies the SU request. Our scheme is not limited to a centralized scheduling architecture, however. It can be used in a carrier sense multiple access (CSMA) system as well. In such a system, the SUs would sense the channel and use our processes to predict residual idle time before transmitting as a form of collision avoidance. Analysis and application of prediction schemes presented in this paper to a CSMA based system is beyond the scope of this study.

Most of the stochastic based schemes assume a certain distribution (e.g., exponential) of spectrum occupancy data or require that a distribution be fitted to a set of observed data. The processes here do not include this requirement. It uses a non-parametric estimate of the cumulative hazard function from historical data to grant dynamic access to the SUs.

Finally, the processes were run with actual spectrum occupancy data and were suitable for implementation on practical systems. We show the effectiveness of our DSA processes over LTE Band 17, which is centered at 709 MHz with a 10 MHz bandwidth in the uplink.

The process can be used in the Spectrum Sharing architecture in the 3.5 GHz band. In this architecture, there will be three tiers of users in the band. First tier users have the highest priority, but they use the band infrequently. The tier two users, called Priority Access Layer (PAL) users, will likely be LTE carriers and have medium priority. When tier 1 and tier 2 users are not present in the band, it can be used by tier 3 users called General Authorized Access (GAA) users. It is conceivable that a PAL user can sell its white spaces (idle times) to users who can make use of transmission opportunities of the order of hundreds of milliseconds as long as the interference to PAL users remains below an agreed threshold. These opportunistic users can implement our scheme to exploit PAL white spaces.

Figure 5:
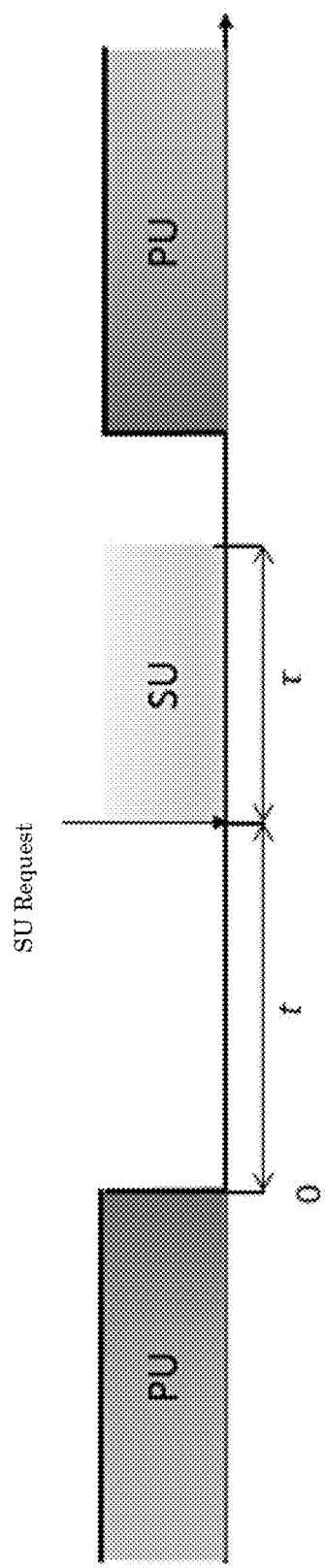
FIG. 5 shows a request for access by a secondary user.

The processes concern how long the channel has been unoccupied by the PU and how much longer the channel will remain unoccupied. Specifically, given that the channel has been unoccupied by the PU for duration t and a request from an SU arrives to transmit for a duration τ, what is the probability that the SU will be able to complete the transmission before the PU appears on the channel? FIG. 5 shows a relationship between the PU and SU.

Survival analysis is used to analyze statistical properties of the duration of time until an event, such as failure in a mechanical system, occurs. Our prediction problem can be solved by using survival analysis as presented below. Let $T_1$, $S_1$, $T_2$, $S_2$, ..., represent the successive idle and busy periods of the spectrum. Thus, $T_i$, and $S_i$, represent the $i^{th}$ idle and busy periods respectively. The $T_i$s can be thought of as survival times. That is, an idle period survives only until the channel becomes busy again. Let random variable T represent an arbitrary survival time and $0<p<1$ an adjustable parameter.

Assuming the $T_i$, are independent and identically distributed as T, our prediction problem can be represented by the hypothesis testing problem given by $$H_0: P[T \geq t+\tau | T \geq t] > p \text{ versus } H_1: P[T \geq t+\tau | T \geq t] < p \quad (2)$$

$H_0$ holds if the idle period, having lasted t units of time, lasts τ more units of time with probability greater than p.

Note that p represents the probability of successful transmission for duration τ, given that the channel has been idle for duration t.

The basic functions of survival analysis are the survival function and the hazard function. The survival function at time t is the probability of surviving at least t units of time and is given by $$S(t) = P[T \geq t] = 1 - F(t) = \int_t^\infty f(s) ds \tag{3}$$

where f(s) and F(t) are the probability density function and cumulative distribution function of T, respectively. The hazard function is the probability of instantaneous failure at time t given survival up to time t and indicates the risk of failure at time t. The hazard function is given by $$h(t) = \lim_{\delta t \to 0} \frac{P[t \leq T < t + \delta t \mid T \geq t]}{\delta t} \tag{4}$$
$$= \lim_{\delta t \to 0} \frac{P[t \leq T < t + \delta t]}{P[T \geq t] \cdot \delta t}$$
$$= \frac{1}{P[T \geq t]} \cdot \lim_{\delta t \to 0} \frac{P[t \leq T < t + \delta t]}{\delta t}$$
$$= \frac{f(t)}{S(t)}$$

From (3), it is clear that the derivative of S(t) is −f(t). Hence, (4) can be rewritten as $$h(t) = -\frac{d}{dt} \log S(t) \tag{5}$$

Now integrating both sides of (5) from 0 to t, noting that S(0)=1 and finally taking the exponential on both the sides, we have $$S(t) = \exp\left(-\int_0^t h(s) ds\right) \tag{6}$$

The function important to us is the cumulative hazard function, defined by $$H(t) = \int_0^t h(s) ds, t \geq 0$$

Using (6) we have $$P[T \geq t + \tau \mid T \geq t] = \frac{P[T \geq t + \tau]}{P[T \geq t]} \tag{7}$$
$$= \exp\left(-\int_0^{t+\tau} h(s) + \int_0^t h(s) ds\right)$$
$$= \exp(-[H(t+\tau) - H(t)]).$$

Thus, using (7) the hypotheses in (2) can be expressed as $$H_0: \exp(-[H(t+\tau) - H(t)]) > p \text{ versus } H_1: \exp(-[H(t^\circ \tau) - H(t)]) \leq p \tag{8}$$

Having observed a large sample $T_1, T_2, \ldots, T_n$ of n survival times, a non-parametric estimate of the survival function can be computed using the empirical distribution function, $F_n(t)$ of the data $T_i$, i=1, . . . ,n, as shown below.

$$S_n(t) = 1 - F_n(t) = 1 - \frac{1}{n} \sum_i 1_{T_i < t} \tag{9}$$

where $1_A$ is the indicator function for event A.

Let $T_{(1)} \leq T_{(2)} \ldots \leq T_{(n)}$ be the ordered $T_i$, i=1 . . . , n. Then the survival function at any $T_{(i)}$ can be computed using (9) as follows.

$$S_n(T_{(i)}) = 1 - \frac{1}{n} \sum_{j=1}^n 1_{T_j < T_{(i)}} \tag{10}$$
$$= 1 - \frac{1}{n} \cdot (i - 1) = \frac{n - i + 1}{n}$$

In the above derivation, we used the fact that exactly (i−1) values of $T_i$ are strictly less than $T_{(i)}$. Each $T_{(i)}$, 1≤i≤n, has an estimated probability of occurrence of $$\frac{1}{n}.$$

Hence, $$\int_n (T_{(i)}) = \frac{1}{n} \tag{11}$$

Using (10) and (11) in (4) we have $$h_n(T_{(i)}) = \frac{1}{n - i + 1}$$

for i=1, 2, . . . , n $h_n(t)$=0 for all other t

Using the definition of the cumulative hazard function, an estimate is given by $$H_n(t) = \sum_{i: T_{(i)} \leq t} \frac{1}{n - i + 1} \tag{12}$$

Our test statistic is based on the difference of the cumulative hazard function at two different times. An estimate for the difference of the cumulative hazard function at two different times is given by $$H_n(t + \tau) - H_n(t) = \sum_{i: t \leq T_{(i)} \leq t + \tau} \frac{1}{n - i + 1} \tag{13}$$

Note that this is a form of the well-known Nelson-Aalen estimator for the cumulative hazard function. We used a more general form of $H_n(t)$ to account for duplicate values of $T_{(i)}$, that is, multiple idle times of the same duration [20]. Therefore, after simple manipulation of $H_0$ in (8), our prediction processes are formulated in terms of an approximate test statistic, $$\text{Reject } H_0 \text{ if: } H_n(t+\tau) - H_n(t) \geq (-\ln p). \tag{14}$$

Below are two formulations of the prediction process. The first is a request to transmit on a channel for duration τ. If the channel is occupied at the time of request, the request is denied. If the channel is not occupied, then the process grants the request if it determines that the probability of a successful transmission (i.e., the probability of completing the transmission without colliding with the PU) is above a given threshold.

```
PROCESS 1:
Request channel for τ seconds
input:
        τ - the transmit duration requested parameters:
        H_n(t) - the estimated cumulative hazard function
        t_0 - the time elapsed since end of last transmission
        p - the probability of successful transmission
output:
        Grant or Deny
    if occupied then
        return Deny
    end if
    θ := -lnp
        W_n := H_n(t_0 + τ) - H_n(t_0)
    if W_n < θ then
        return Grant
    else
        return Deny
    end if
```

The second process returns the longest estimated duration available for transmission for a request made at a particular time. The time returned is the largest value for which the probability of successful transmission exceeds the given threshold.

```
PROCESS 2:
Request maximum channel availability
parameters:
        H_n(t) - the estimated cumulative hazard function
        {T_(i)} - the n ranked idle times used to compute H_n(t)
        t_0 - the time elapsed since end of last transmission
        p - the probability of successful transmission
output:
        τ - the maximum transmit time available now
    if occupied then
        return 0
    end if
    θ := -lnp
    Find largest τ in [0, T_(n)] such that H_n(t_0+τ)- H_n(t_0) < θ
    return τ
```

To evaluate the processes, we used real LTE uplink spectrum occupancy data to represent our primary user occupancy. Secondary user requests for spectrum were simulated using a Poisson arrival model, i.e., the SU request inter-arrival times were exponentially distributed.

Data was collected in Band 17, a 10 MHz uplink LTE band centered at 709 MHz. A small 10.78 cm rubber duck antenna was connected to an Ettus Universal Software Radio Peripheral (USRP) running USRP hardware driver (UHD) version 003.009.001 and GNU Radio version 3.7.9rc1. The output is a 56-point power spectrum computed every 100 ms. Each power spectrum coefficient is an 8-bit signed integer representing a decibel (dB) value rounded to the nearest integer. Each coefficient corresponds to peak power in dB over a 180-kHz range. The middle 50 coefficients correspond to the 50 LTE channels. We applied a noise threshold power value to produce a binary occupancy sequence for each of the 50 channels. We looked at all the different power values collected and picked the 75th percentile value as the noise threshold. For the data collected, the threshold turned out to be -67 dB. The idle time distributions for day1 and day2 are presented in Table 1.

Data was collected for two continuous 48 hour periods. The first 48 hours ran from 2:00 PM UTC (9:00 AM local time) Monday, Feb. 1, 2016 to 2:00 PM UTC on Wednesday, Feb. 3, 2016. The second dataset covers weekend hours, 2:00 PM UTC Saturday, Feb. 27, 2016 to 2:00 PM UTC Monday, Feb. 29, 2016. Each 48-hour data set is split into two parts, each containing 24 hours of data. Thus, the data captured from Monday9 AM to Tuesday9 AM is designated as day1 data, and the data captured from Tuesday9 AM to Wednesday9 AM is designated as day2. Similarly, the weekend data is termed as wknd1 and wknd2.

As stated above, an idle period of the spectrum occupancy is a set of one or more consecutive zeros. Each zero represents an idle period with a duration of one sampling interval (100 ms for our experiments). Thus, the $T_i$ values (in terms of sampling interval) are represented as the number of consecutive zeros. Similarly, a busy period is a set of one or more consecutive ones. In our experiments, we have used the occupancy of LTE uplink channel number 5 as our PU traffic. After building the idle and busy periods, we then compute the cumulative hazard function as per (13). We have set the probability of successful transmission (p) to 0.9. Thus, the interference threshold, which is equal to (1-p), is set to 0.1. Note that the PU expects its measured probability of interference (PoI) to be less than this preset interference threshold.

We have evaluated the performance of process 1 and process 2 in different configurations as described below. The configurations are denoted as train_run, where train is the data used for training the process (i.e., the cumulative hazard function is built using this data) and run represents the data which is used to run the process. We have four data sets, each of 24 hours duration.

As an example, in configuration day1_day1, the processes are trained using day1 data, i.e., the cumulative hazard function is built using day1 data and then the process is also run on day1 data. Results from this configuration validate the effectiveness of survival analysis for opportunistic spectrum access.

When using configuration day1_day2 the processes are trained using day1 data but run on day2 data. This configuration helps us understand how the processes perform when the training and running data are from different week days. Note that in practice, the day1_day1 configuration does not correspond to a realistic scenario, since the training has to happen on some historical data and then the process would run on different data. Hence, this configuration is useful in practice.

Yet another example is configuration wknd1_day1. This configuration helps us determine if it is feasible to train the process on a weekend data set and run it on a week day data set.

We used the following metrics to measure performance of the two processes. The first two metrics are common to both the processes whereas the remaining four are defined for process 1 only.

White Space Utilization (WSU): Given the spectrum occupancy of a channel, White Space Utilization (WSU) of the channel by a secondary user is defined as the fraction of total idle time used by the secondary user for its own transmission. In another word, it is the ratio of total duration of idle time used by the secondary user for its own transmission to the total idle time duration in the spectrum occupancy of the channel.

PoI: For a given channel, the PoI of the secondary user is defined as the probability that a transmission of the SU collides with that of the PU. Thus, it is the ratio of the number of times an SU transmission collides (or runs into a busy period) with a PU transmission to the total number of SU transmissions over a statistically long observation period.

Desirable Accept Ratio (DAR): This is defined as the fraction of requests that were accepted and the corresponding transmissions were successful. In these cases, the process correctly predicted the remaining idle time.

Undesirable Accept Ratio (UAR): This is defined as the fraction of requests that were accepted and the corresponding transmissions were not successful, i.e., these transmissions resulted in collision with PU transmission. In these cases, the process incorrectly predicted the remaining idle time.

Desirable Reject Ratio (DRR): This is defined as the fraction of requests that were rejected and would have resulted in collision with the PU if they were accepted. So, in these cases the process correctly predicted the remaining idle time and rejected the requests.

Undesirable Reject Ratio (URR): This is defined as the fraction of requests that were rejected and would have resulted in successful transmission if they were accepted. In these cases, the process incorrectly predicted the remaining idle time and rejected the requests. This metric represents lost opportunities for the SU.

TABLE 1

| Length (sample interval) | Number of occurrences day1 (%) | Number of occurrences day2 (%) | Length (sample interval) | Number of occurrences day1 (%) | Number of occurrences day2 (%) |
|---|---|---|---|---|---|
| 1 | 10 331 (39.75%) | 9866 (35.98%) | (10, 20] | 760 (2.92%) | 1093 (3.99%) |
| 2 | 8523 (32.78%) | 8784 (32.03%) | (20, 30] | 281 (1.08%) | 447 (1.63%) |
| 3 | 2174 (8.36%) | 2475 (9.03%) | (30, 40] | 165 (0.63%) | 258 (0.94%) |
| 4 | 957 (3.68%) | 969 (3.53%) | (40, 50] | 124 (0.48%) | 149 (0.54%) |
| 5 | 664 (2.55%) | 796 (2.9%) | (50, 500] | 546 (2.1%) | 783 (2.86%) |
| 6 | 431 (1.66%) | 491 (1.79%) | (500, 5000] | 64 (0.25%) | 133 (0.48%) |
| 7 | 308 (1.18%) | 361 (1.32%) | (5000, 10 000] | 5 (0.02%) | 18 (0.07%) |
| 8 | 264 (1.02%) | 302 (1.1%) | (10 000, 17 871] | 3 (0.01%) | 10 (0.04%) |
| 9 | 240 (0.92%) | 295 (1.08%) | (17 871, 132 171] | 4 (0.01%) | 0 (0%) |
| 10 | 152 (0.58%) | 193 (0.7%) | | | |

Figure 6:
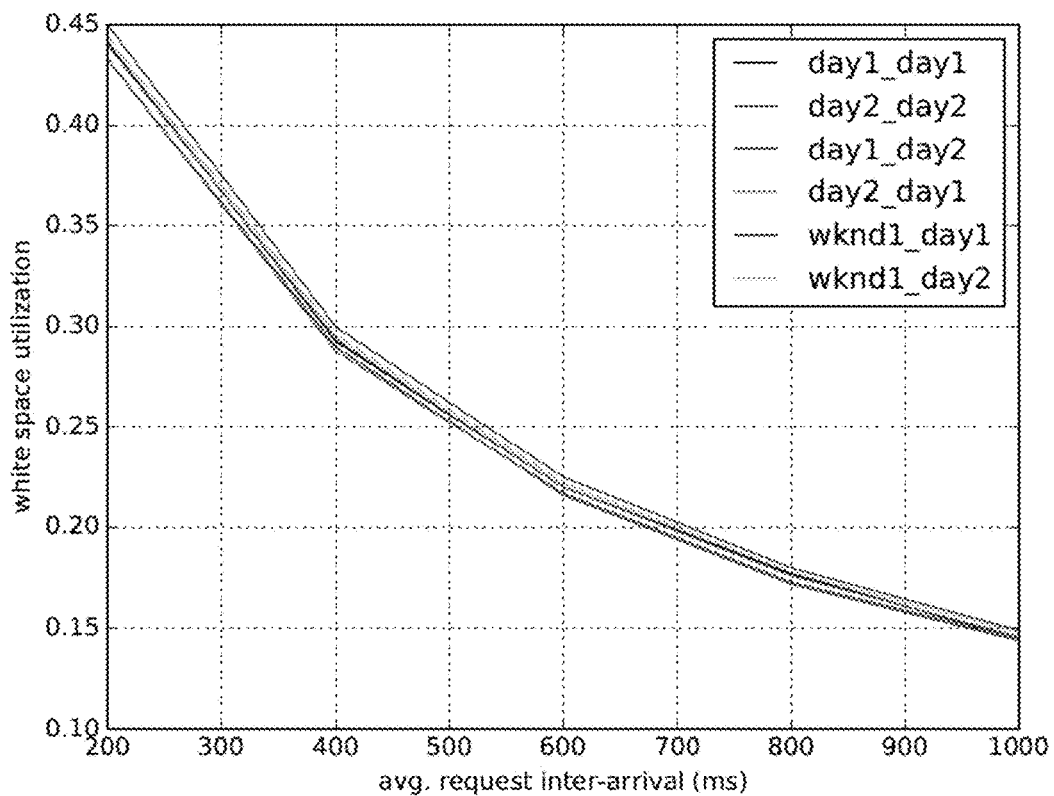
FIG. 6 shows a graph of white space use versus average request inter-arrival time.

FIG. 6 shows the performance of process 1 in terms of WSU as average request inter-arrival time varies. As request inter-arrival time increases, WSU decreases since the offered load from the SU decreases. It is interesting to note that the performance of all the configurations in terms of WSU are almost the same. Since the cumulative hazard functions of the different days have almost the same slope for most of the values between n=0 to n=100, the decision to accept or reject a request is almost the same regardless of which day's data is used for training. This leads to nearly the same WSU for different configurations. Thus, process 1 can be trained using data from any of the days without significantly affecting the WSU of the system.

Figure 7:
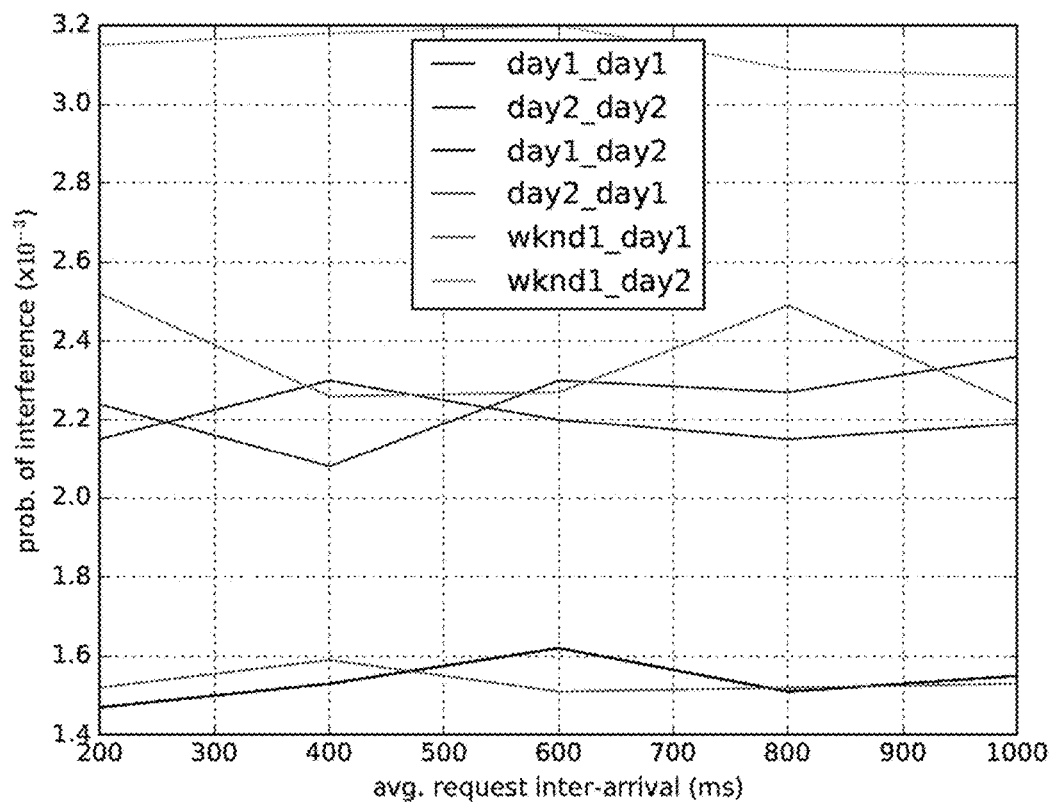
FIG. 7 shows a graph of probability of interference versus average request inter-arrival time.
Figure 9:
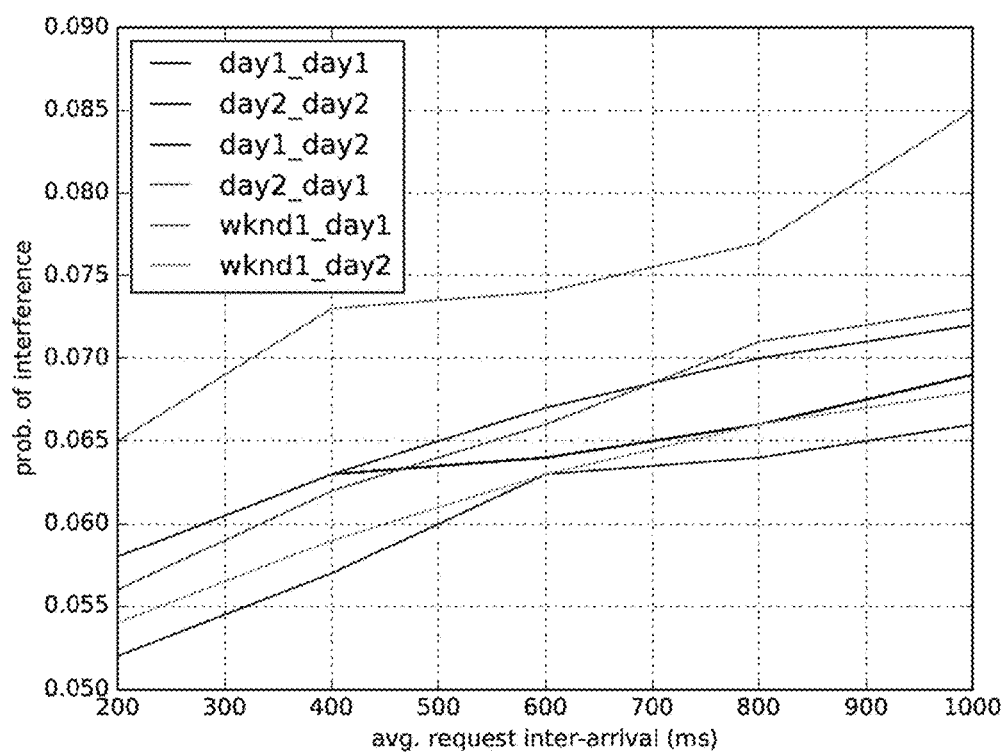
FIG. 9 shows a graph of probability of interference versus average request inter-arrival time.

From FIG. 7, we observe that the PoI is always less than the set threshold of 0.1. When we compare the PoI of process 2 (see FIG. 9), we notice that the PoI is an order of magnitude less than that of process 2. Process 1 only transmits for a fixed duration when the request is granted. The fixed duration is 200 ms, which is a relatively short duration. In other words, when the requested duration is short, process 1 is less aggressive than process 2. Hence, the probability of an SU transmission colliding with the PU is very low.

Figure 8:
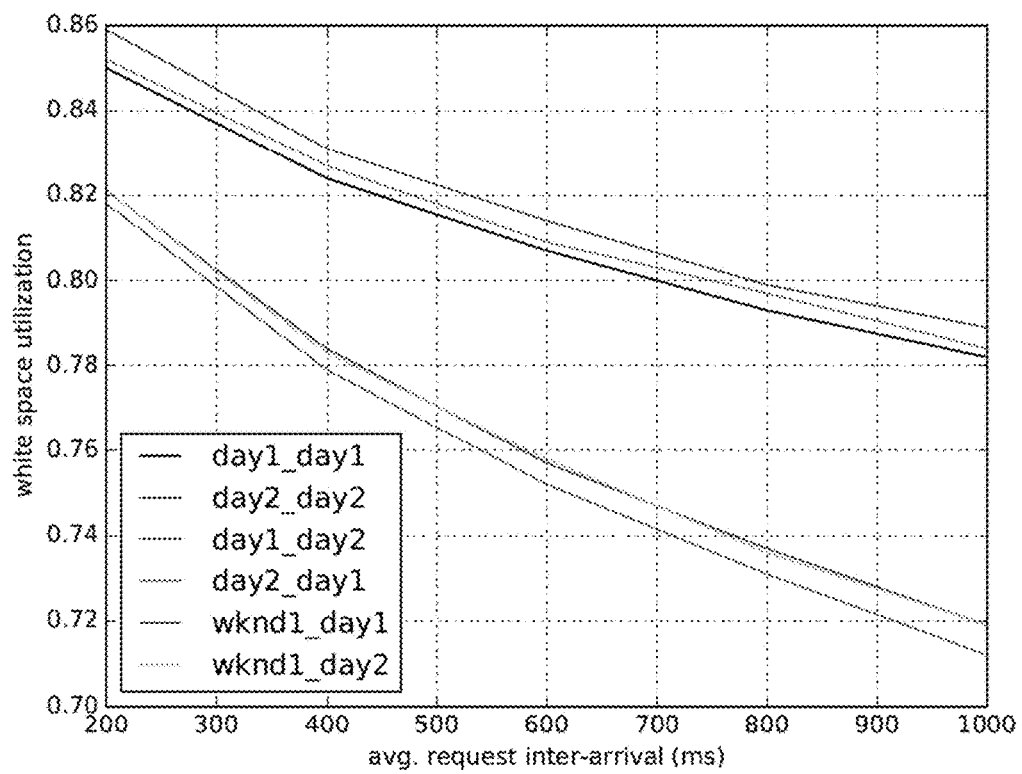
FIG. 8 shows a graph of a graph of white space use versus average request inter-arrival time.
Figure 10:
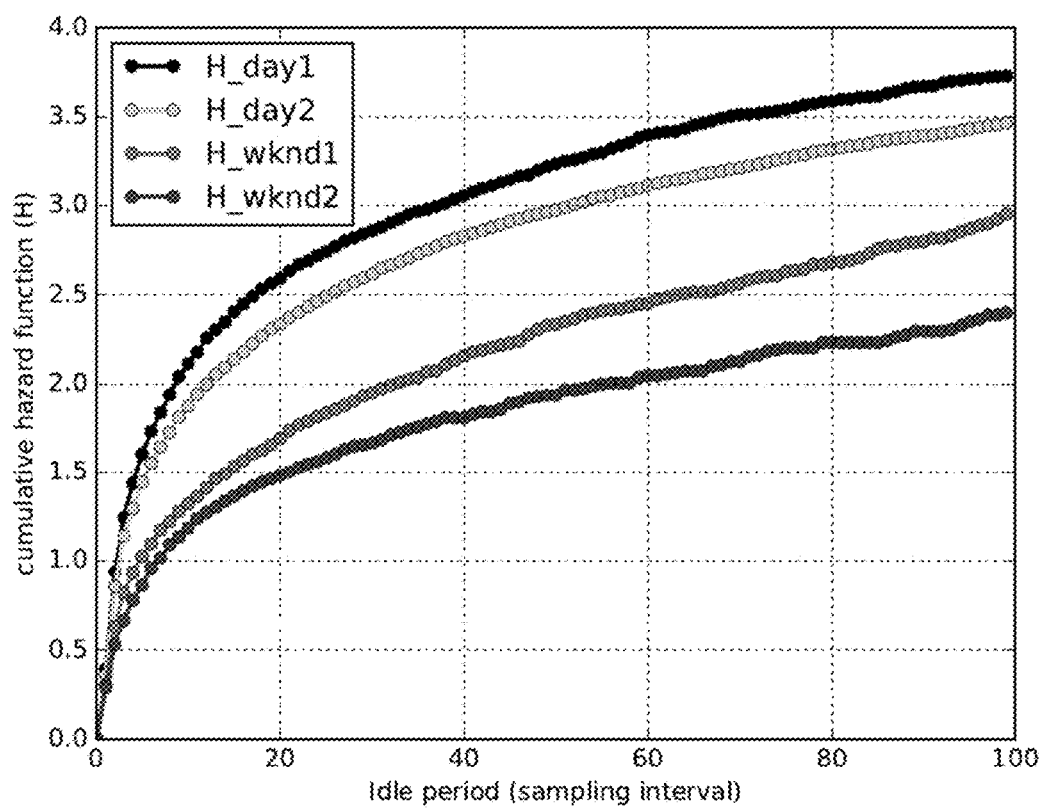
FIG. 10 shows a graph of cumulative hazard function versus idle period.
Figure 11:
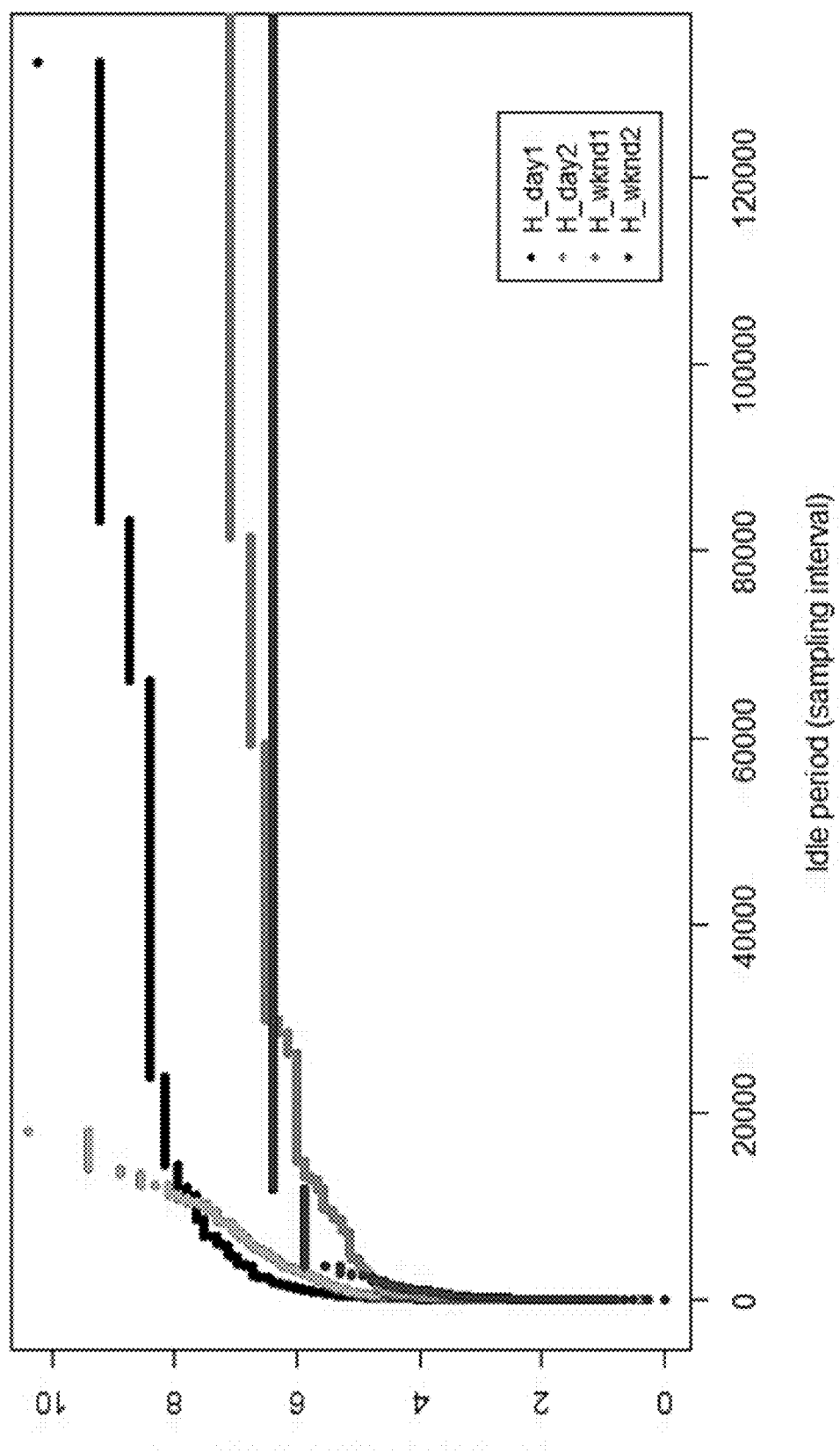
FIG. 11 shows a graph of cumulative hazard function versus idle period.

FIG. 8 shows the performance of process 2 in terms of WSU. As the average request inter-arrival time increases, the SU exploits less white space for transmission. Hence, the WSU decreases. We also notice that WSUs for the set of configurations which are run on day1 (e.g., day1_day1, day2_day1, wknd1_day1) are higher than those run on day2. This can be explained by studying the cumulative hazard functions of the two days. The cumulative hazard functions of the data set are shown in FIG. 10 and FIG. 11. Since the range of idle period is very large, we show the $H(\cdot)$ function up to 100 sampling intervals in FIG. 10, whereas FIG. 11 shows the entire range of idle period. The cumulative hazard functions of day1 and day2 have almost the same slope for idle periods less than 100 sampling intervals. Hence, for a given time of arrival of an SU request, the maximum duration granted would be almost the same for the two days. So, the idle time distribution of the two days has more influence than the $H(\cdot)$ function on the WSU for the two days for grants less than 100 sampling intervals. From Table 1, we observe that day1 has some very large idle times. For example, day1 has four idle times in the range (17871, 132171], which are very large idle times, whereas the maximum idle time of day2 was 17871. This leads to more transmission opportunities for the SU when running over day1 data and gives rise to higher WSU for day1 than for day2. Now for idle periods greater than 100 sampling periods (refer to FIG. 7), for day2, the slope of $H(\cdot)$ is very steep, whereas for day1 the slope flattens due to the extremely long run lengths of idle periods. Thus, when the time of arrival of a request falls into an idle period that has lasted longer than 100 sampling intervals, day1 grants longer transmission opportunities. Furthermore, when the elapsed idle time is more than the longest idle period in the training data, the transmission opportunity granted is set to the longest idle period of training data. These two factors also contribute to higher WSU for day1 than day2.

Since the cumulative hazard functions of the four days have almost equal slope for most of the n values less than 100 sampling intervals, training the process on data from any day produces nearly the same WSU for that given day. Thus, the curves for day1_day1, day2_day1 and wknd1_day1 are close to each other.

When we compare the WSU performance of process 1 with process 2 for a given request inter-arrival time, we notice that the WSU of process 1 is much lower than that of process 2. The fundamental design of the two processes gives rise to this behavior. For a given request, process 2 maximizes the SU transmission duration, whereas process 1 only checks to see if it can grant a request for a constant transmission duration (200 ms in our experiment). Thus, process 2 is able to achieve higher WSU.

TABLE 2

| Configuration | DAR (%) | UAR (%) | DRR (%) | URR (%) |
|---|---|---|---|---|
| day1 day1 | 78.7 | 0.2 | 21.1 | 0 |
| day2 day1 | 78.6 | 0.2 | 21.1 | 0 |
| wknd1 day1 | 81.4 | 0.4 | 18.2 | 0 |
| day2 day2 | 76.2 | 0.3 | 23.5 | 0 |
| day1 day2 | 76.2 | 0.3 | 23.5 | 0 |
| wknd1 day2 | 79.6 | 0.5 | 19.9 | 0 |

Process 1 has no lost opportunities in all the configurations. The process also has very low UAR, which is good, since this metric shows how well the process avoids making bad decisions in accepting a request. All our experiment runs were for a very long duration (approximately twenty-four hours). Hence, the number of SU requests were very large. So, the computed performance metrics of the two processes (e.g., WSU and PoI) had very little variation across different runs.

We introduced DSA processes based on survival analysis that make efficient use of white space in an LTE band, even at very fine time scales. They are stochastic but nonparametric and therefore do not require the assumption of a particular distribution. This makes the implementation simple. The tuning parameter for the process is the probability of successfully completing a transmission or, equivalently, the PoI. Thus, it is easy to interpret and directly reflect desired system performance metrics. We used real LTE band occupancy data for the PU activity in our simulations. Our results show that if the cumulative hazard functions are fairly similar (in terms of slope) across different datasets, the processes can be trained on one day's dataset and run on another day's dataset without significant degradation of performance. This is a very important property of the processes, since in practice, the processes will be trained on historical data and then run in real-time. We expect that in actual spectrum sharing systems the PUs will be wary of sharing their spectrum with SUs for fear of too much interference. This is addressed in our processes by showing that the PoI is always below the preset threshold in all configurations.

This paper provides an initial performance analysis of the processes in an LTE band. Evaluation using datasets collected in different bands at varying locations with other traffic characteristics needs to be done. Other time scales need to be investigated to show the range over which the processes are effective. A theoretical performance analysis and comparison with other prediction schemes are needed as well.

A form of spectrum requests that includes a maximum or desired transmit time and a minimum acceptable time can be used with the processes. The process denies the request or returns a grant duration in the requested range. Another form includes the user requesting a minimum initial grant and then the scheduler can add additional follow-on transmission time, if available, once the initial request has elapsed. An adaptive version of the process can be used to update the estimated cumulative hazard function as new idle periods appear in the spectrum.

Embodiments of the subject matter and the operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more computers executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, workstations, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic; magneto-optical disks, optical disks, USB drives, and so on. However, a computer need not have such devices. Moreover, a computer can be embedded in another device, e.g., a mobile telephone, a personal digital assistant (PDA), a microwave oven, mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The central processing unit and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). Such interconnects may involve electrical cabling, fiber optics, or be wireless connections.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A process for dynamically controlling spectrum access, the process comprising:
   collecting occupancy data of a primary user of a wireless communication channel;
   applying a nonparametric estimation to the occupancy data;
   determining a cumulative hazard function of the occupancy data, based on the nonparametric estimation;
   receiving a service request to occupy the wireless communication channel from a secondary user;
   accepting the service request from the secondary user if the wireless communication channel is unoccupied by the primary user;
   calculating a maximum duration for which the secondary user may occupy the wireless communication channel by:
      taking a difference in value of the cumulative hazard function at a time of the service request and at a time of completion of a transmission of the secondary user; and
      comparing the difference to a threshold value comprising a probability that a remaining idle time of the primary user is greater than an occupation time of the wireless communication channel of the secondary user;
   granting access to the secondary user for occupation of the wireless communication channel if the probability is greater than a selected probability threshold; and
   denying access to the secondary user for occupation of the wireless communication channel if the probability is less than the selected probability threshold to dynamically control spectrum access.

2. The method of claim 1, further comprising: rejecting the service request from the secondary user if the wireless communication channel is occupied by the primary user.

3. A computer-implemented method, comprising:
   collecting occupancy data of a primary user of a wireless communication channel;
   applying a nonparametric estimation to the occupancy data;
   determining a cumulative hazard function of the occupancy data, based on the nonparametric estimation;
   receiving a service request to occupy the wireless communication channel from a secondary user;
   accepting the service request from the secondary user if the wireless communication channel is unoccupied by the primary user.
   calculating a maximum duration for which the secondary user may occupy the wireless communication channel by:
      taking a difference in value of the cumulative hazard function at a time of the service request and at a time of completion of a transmission of the secondary user; and
      comparing the difference to a threshold value comprising a probability that a remaining idle time of the primary user is greater than an occupation time of the wireless communication channel of the secondary user;
   granting access to the secondary user for occupation of the wireless communication channel if the probability is greater than a selected probability threshold; and
   denying access to the secondary user for occupation of the wireless communication channel if the probability is less than the selected probability threshold to dynamically control spectrum access.

4. The computer-implemented method of claim 3, further comprising: rejecting the service request from the secondary user if the wireless communication channel is occupied by the primary user.

5. A system comprising:
   one or more computers configured to perform operations, the operations comprising:
   collecting occupancy data of a primary user of a wireless communication channel; applying a nonparametric estimation to the occupancy data;
   determining a cumulative hazard function of the occupancy data, based on the nonparametric estimation;
   receiving a service request to occupy the wireless communication channel from a secondary user;
   accepting the service request from the secondary user if the wireless communication channel is unoccupied by the primary user.
   calculating a maximum duration for which the secondary user may occupy the wireless communication channel by:
      taking a difference in value of the cumulative hazard function at a time of the service request and at a time of completion of a transmission of the secondary user; and
      comparing the difference to a threshold value comprising a probability that a remaining idle time of the primary user is greater than an occupation time of the wireless communication channel of the secondary user;
   granting access to the secondary user for occupation of the wireless communication channel if the probability is greater than a selected probability threshold; and
   denying access to the secondary user for occupation of the wireless communication channel if the probability is less than the selected probability threshold to dynamically control spectrum access.

6. The system of claim 5, further comprising: rejecting the service request from the secondary user if the wireless communication channel is occupied by the primary user.

7. A non-transitory computer-readable medium having instructions stored thereon, which, when executed by a processor, cause the processor to perform operations comprising:

collecting occupancy data of a primary user of a wireless communication channel;

applying a nonparametric estimation to the occupancy data;

determining a cumulative hazard function of the occupancy data, based on the nonparametric estimation;

receiving a service request to occupy the wireless communication channel from a secondary user;

accepting the service request from the secondary user if the wireless communication channel is unoccupied by the primary user.

calculating a maximum duration for which the secondary user may occupy the wireless communication channel by:

taking a difference in value of the cumulative hazard function at a time of the service request and at a time of completion of a transmission of the secondary user; and comparing the difference to a threshold value comprising a probability that a remaining idle time of the primary user is greater than an occupation time of the wireless communication channel of the secondary user;

granting access to the secondary user for occupation of the wireless communication channel if the probability is greater than a selected probability threshold; and denying access to the secondary user for occupation of the wireless communication channel if the probability is less than the selected probability threshold to dynamically control spectrum access.

8. The computer-readable medium of claim 7 in which the operations further comprise: rejecting the service request from the secondary user if the wireless communication channel is occupied by the primary user.

* * * * *